(12) United States Patent
Roy

(10) Patent No.: US 12,310,303 B2
(45) Date of Patent: May 27, 2025

(54) RAISED PLANTER

(71) Applicant: Yvon Roy, St. Marie (CA)

(72) Inventor: Yvon Roy, St. Marie (CA)

( * ) Notice: Subject to any disclaimer, the term of this patent is extended or adjusted under 35 U.S.C. 154(b) by 0 days.

(21) Appl. No.: 17/471,087

(22) Filed: Sep. 9, 2021

(65) Prior Publication Data
US 2022/0117164 A1 Apr. 21, 2022

(30) Foreign Application Priority Data
Oct. 15, 2020 (CA) ..................... 3096175

(51) Int. Cl.
*A01G 9/00* (2018.01)
*A01G 9/02* (2018.01)
*A01G 9/14* (2006.01)

(52) U.S. Cl.
CPC .......... *A01G 9/02* (2013.01); *A01G 9/1423* (2013.01)

(58) Field of Classification Search
CPC .......... A01G 9/02; A01G 9/1423; A01G 9/00; A01G 5/04; A47B 47/00; A47B 47/0083; A47B 47/027; A47B 47/045; A47G 7/00; A47G 7/04; A47G 7/041
USPC .................................................. 211/189, 206
See application file for complete search history.

(56) References Cited

U.S. PATENT DOCUMENTS

| | | | | |
|---|---|---|---|---|
| 1,673,324 A * | 6/1928 | Gardner | ................... | B65D 9/24 217/69 |
| 2,203,625 A * | 6/1940 | Friedel | ..................... | B65D 9/24 217/65 |
| 2,491,271 A * | 12/1949 | King | ..................... | A01G 9/1423 47/18 |
| 2,524,246 A * | 10/1950 | Young | .................. | A01G 9/1423 217/3 R |
| 2,545,717 A * | 3/1951 | Voigt | .................... | A01G 9/1423 47/18 |
| 4,973,110 A * | 11/1990 | Nyquist | ................. | A47B 47/03 312/265.2 |
| 5,617,622 A * | 4/1997 | Anderson | ................ | B25H 1/00 269/910 |
| 5,829,654 A * | 11/1998 | Weger, Jr. | ................. | B60R 9/04 224/325 |
| 5,850,924 A * | 12/1998 | Borter | ................... | A47F 7/0042 211/41.15 |
| 6,018,910 A * | 2/2000 | Marks | ...................... | A01G 9/00 47/66.1 |
| 6,019,446 A * | 2/2000 | Laboch | .................. | H02B 1/308 312/265.2 |
| 8,485,422 B2 * | 7/2013 | Rometty | ................... | B65D 5/62 220/DIG. 25 |
| 8,905,254 B2 * | 12/2014 | Joubert | ................... | B65D 19/12 206/386 |
| 10,863,646 B1 * | 12/2020 | Rampey | ................. | A47B 61/02 |
| 11,464,349 B2 * | 10/2022 | Vienne | ................... | A47G 7/041 |

(Continued)

FOREIGN PATENT DOCUMENTS

CN 112930945 A * 6/2021

*Primary Examiner* — Magdalena Topolski
*Assistant Examiner* — Spencer T Callaway
(74) *Attorney, Agent, or Firm* — Bonini IP Law, LLC; Frank J. Bonini, Jr.

(57) ABSTRACT

A raised planter is provided. The raised planter comprises a tray adapted for containing soil and a plurality of support posts mounted to the tray, the support posts being adapted for supporting the tray at a predetermined height above ground.

14 Claims, 5 Drawing Sheets

(56) References Cited

U.S. PATENT DOCUMENTS

| | | | | |
|---|---|---|---|---|
| 2003/0084610 A1* | 5/2003 | Yawney | ............... | A01G 9/1423 |
| | | | | 47/65.5 |
| 2004/0098912 A1* | 5/2004 | Searle | ...................... | A01G 9/02 |
| | | | | 47/65.5 |
| 2005/0039391 A1* | 2/2005 | Morse | .................. | A01K 63/006 |
| | | | | 47/39 |
| 2005/0204621 A1* | 9/2005 | Garrison | ................. | A01G 9/02 |
| | | | | 47/66.1 |
| 2009/0094889 A1* | 4/2009 | Felling | .................. | A47G 7/041 |
| | | | | 248/371 |
| 2015/0359329 A1* | 12/2015 | Frazier | ............... | H01M 50/262 |
| | | | | 211/200 |

* cited by examiner

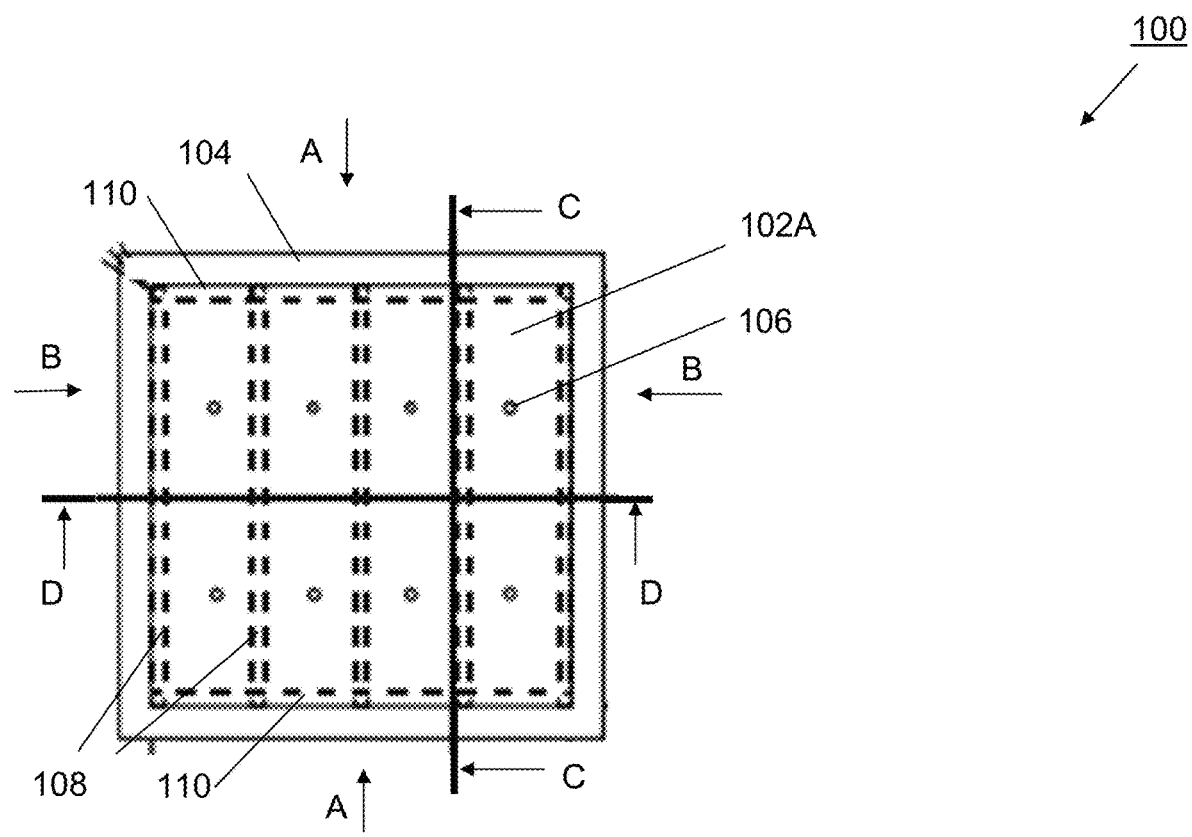
Figure 1
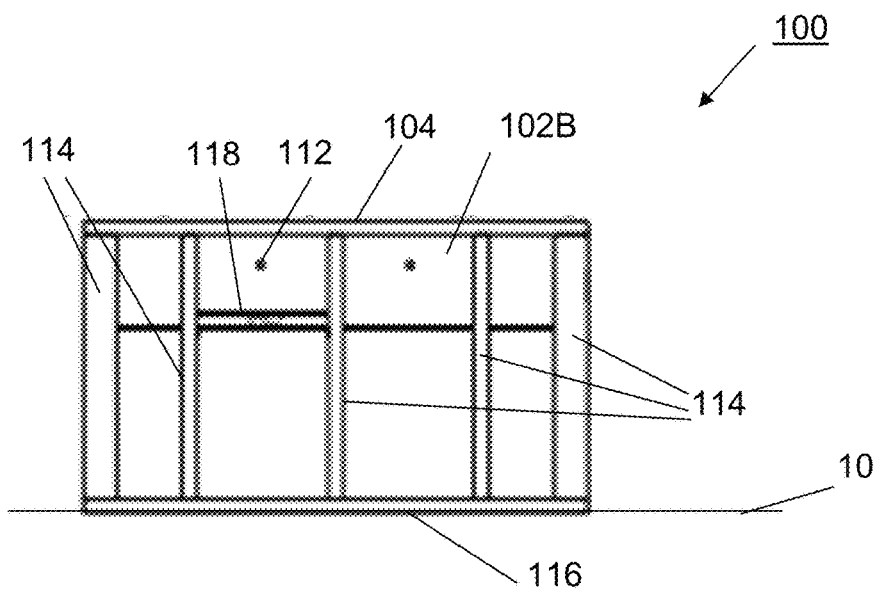
Figure 2 (View A)

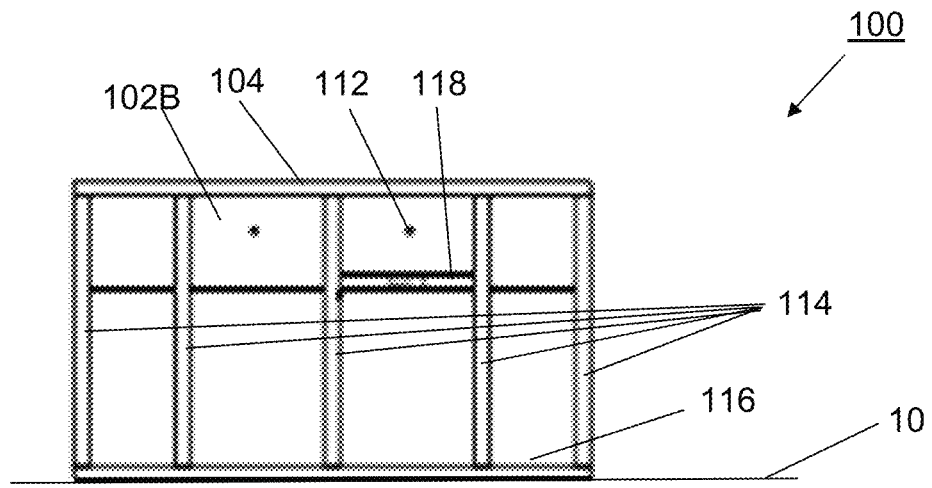
Figure 3 (View B)
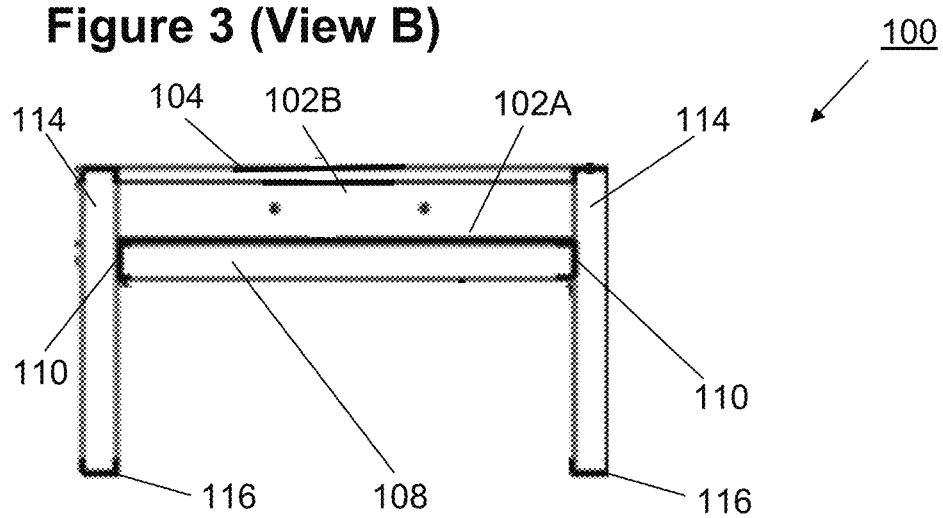
Figure 4 (Section C-C)
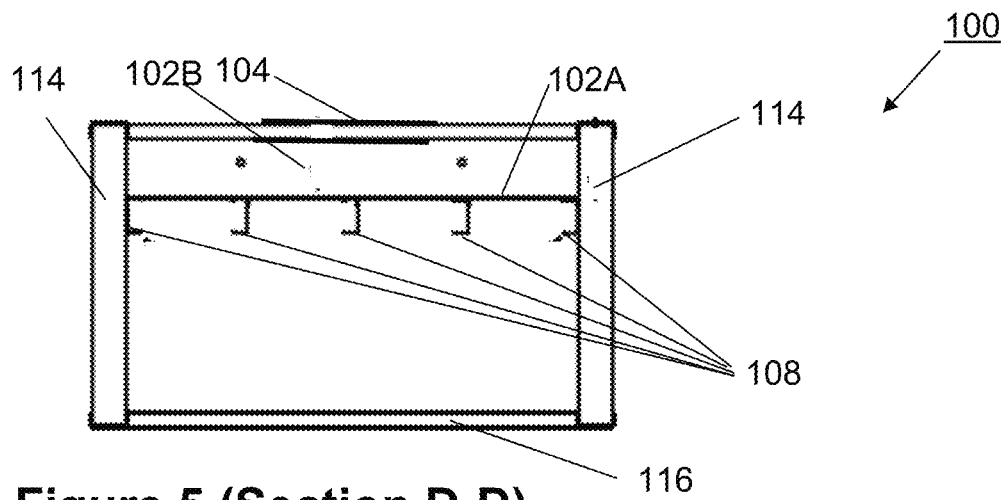
Figure 5 (Section D-D)

RAISED PLANTER

BACKGROUND OF THE INVENTION

1. Field of the Invention

The present invention relates to gardening equipment, and more particularly to a raised planter providing a bed for growing flowers and vegetables outdoors at a predetermined height above ground.

2. Brief Description of the Related Art

Typically, flowers and vegetables are grown in beds at ground level. During the growing season from spring to autumn flower and vegetable beds need a lot of attention for preparing the soil, seeding, planting seedlings, weeding, loosening the soil, fertilizing, harvesting, etc. All these tasks have to be performed either by standing and bending down to ground level or by kneeling on the ground and bending down to ground level for substantial periods of time, thus becoming arduous tasks which may cause back pain, pain in the knees, pain in hips, especially at an older age. Furthermore, when bending down there is still some distance to the ground level which can make it difficult to see smaller weeds, to distinguish between weeds and small seedlings, or to avoid damaging the plants when weeding or loosening the soil.

Additionally, drainage of the soil may become a problem. In particular, after a period of heavy rain the soil of the flower and vegetable beds may become waterlogged, potentially damaging or destroying the plants.

Furthermore, various wild animals such as, for example, voles, rabbits, groundhogs, chipmunks, can cause substantial damage to the plants or even destroy them.

It is desirable to provide a raised planter for growing plants at a predetermined height above ground level to enable gardening tasks absent bending.

It is also desirable to provide a raised planter that enables draining of the soil.

It is also desirable to provide a raised planter that is easily transported and assembled.

It is also desirable to provide a raised planter that lasts a substantial period of time while being exposed to various weather conditions.

SUMMARY OF THE INVENTION

Accordingly, one object of the present invention is to provide a raised planter for growing plants at a predetermined height above ground level to enable gardening tasks absent bending.

Another object of the present invention is to provide a raised planter that enables draining of the soil.

Another object of the present invention is to provide a raised planter that is easily transported and assembled.

Another object of the present invention is to provide a raised planter that lasts a substantial period of time while being exposed to various weather conditions.

According to one aspect of the present invention, there is provided a raised planter. The raised planter comprises a tray adapted for containing soil and a plurality of support posts mounted to the tray. The support posts are adapted for supporting the tray at a predetermined height above ground.

According to the aspect of the present invention, there is provided a raised planter. The raised planter comprises a tray adapted for containing soil and a plurality of support posts mounted to the tray. The support posts are adapted for supporting the tray at a predetermined height above ground. The tray comprises at least a drainage opening disposed in a bottom portion thereof and at least an aeration opening disposed in a side wall thereof.

According to the aspect of the present invention, there is provided a raised planter. The raised planter comprises a tray adapted for containing soil and a plurality of support posts mounted to the tray. The support posts are adapted for supporting the tray at a predetermined height above ground. A flat surface structure surrounds the tray.

According to the aspect of the present invention, there is provided a raised planter. The raised planter comprises a tray adapted for containing soil and a plurality of support posts mounted to the tray. The support posts are adapted for supporting the tray at a predetermined height above ground. A base structure is mounted to a bottom end of each of the support posts, the base structure having a substantially flat bottom surface for being placed on the ground.

According to the aspect of the present invention, there is provided a raised planter. The raised planter comprises a tray adapted for containing soil and a plurality of support posts mounted to the tray. The support posts are adapted for supporting the tray at a predetermined height above ground. A base structure is mounted to a bottom end of each of the support posts, the base structure having a substantially flat bottom surface for being placed on the ground. The raised planter being assembled from parts with the parts being flat sheet material and U-shaped profiles.

The advantage of the present invention is that it provides a raised planter for growing plants at a predetermined height above ground level to enable gardening tasks absent bending.

A further advantage of the present invention is that it provides a raised planter that enables draining of the soil.

A further advantage of the present invention is that it provides a raised planter that is easily transported and assembled.

A further advantage of the present invention is that it provides a raised planter that lasts a substantial period of time while being exposed to various weather conditions.

BRIEF DESCRIPTION OF THE DRAWINGS

A preferred embodiment of the present invention is described below with reference to the accompanying drawings, in which:

FIGS. 1 to 5 are simplified block diagrams illustrating in a top view, a first side view, a second side view, a first cross sectional view, and a second cross sectional view, respectively, a raised planter according to a preferred embodiment of the invention;

DETAILED DESCRIPTION OF THE PREFERRED EMBODIMENT

Figure 6:
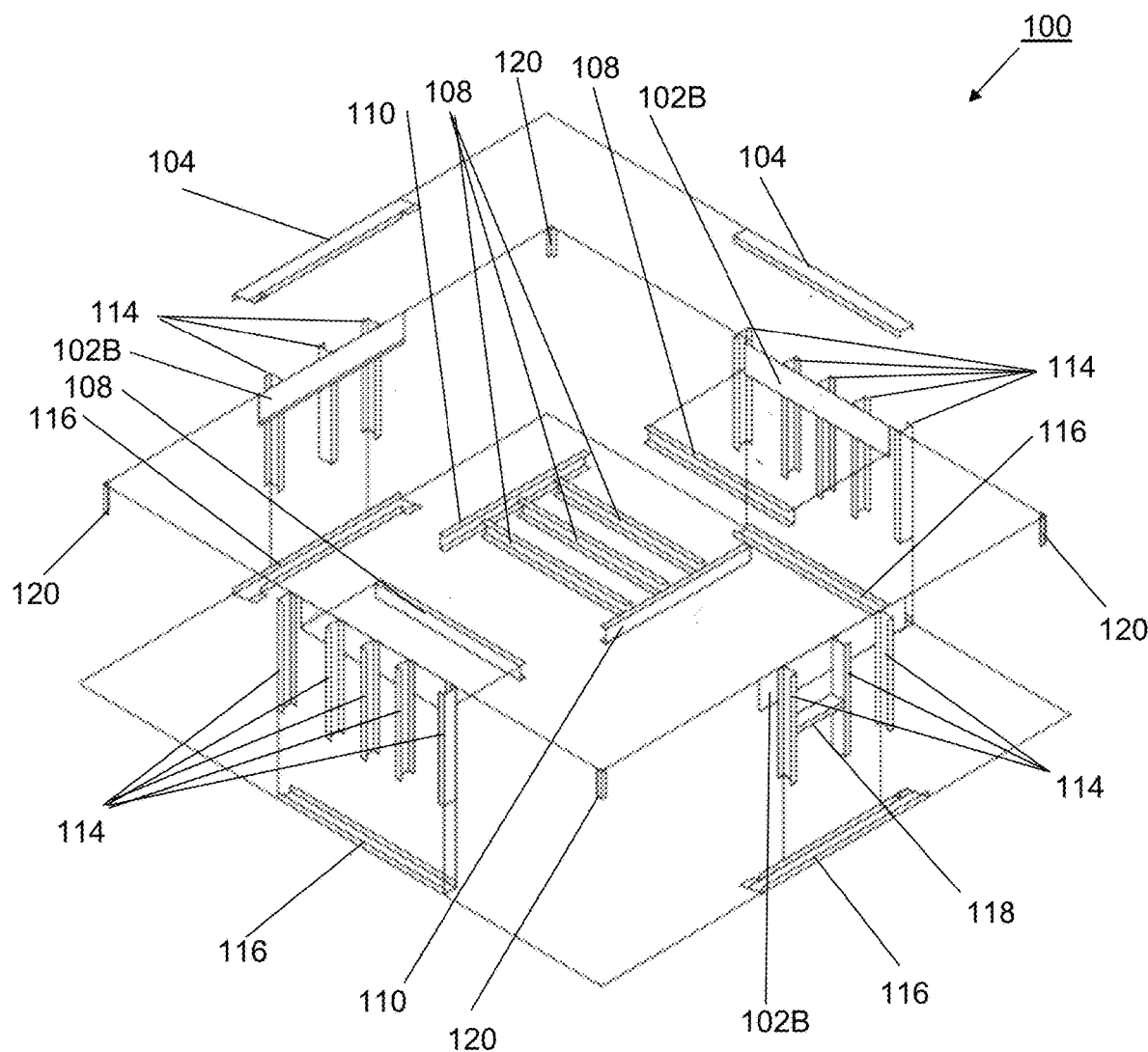
FIG. 6 is a simplified block diagram illustrating in an exploded view arrangement of parts of the raised planter according to the preferred embodiment of the invention; and, FIGS. 7 and 8 are simplified block diagrams illustrating in a top view and a side view, respectively, compact arrangement for shipping of the parts of the raised planter according to the preferred embodiment of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Referring to FIGS. 1 to 8, a raised planter 100 according to a preferred embodiment of the invention is provided. The raised planter 100 comprises a tray for containing soil for planting and growing plants such as, for example, flowers and vegetables. Preferably, the tray comprises bottom plate 102A and side walls 102B. The tray is supported by a plurality of support posts 114, which are adapted for supporting the tray at a predetermined height above ground 10 or a floor such as, for example, a balcony floor or roof garden floor. For example, the length of the support posts 114 is determined such that a top end of the tray is placed approximately 30-35 inches above ground 10, thus enabling gardening work such as, for example, seeding, planting seedlings, weeding, loosening the soil, fertilizing, and harvesting at a convenient level without bending down or kneeling.

Preferably, the tray comprises drainage openings 106 disposed in a bottom portion thereof such as, for example, in the bottom plate 102A, in order to allow excess water, for example, after a heavy rain fall, to drain therefrom. The drainage openings 106 have, for example, a circular cross section with a diameter of approximately 0.5 inch, and are approximately equally distanced placed such that an area of 48 inches×48 inches comprises 8 drainage openings 106. Further preferably, the raised planter 100 comprises aeration openings 112 disposed in the side walls 102B. The aeration openings 112 are, for example, placed at approximately half the height of each of the side walls 102B, have a circular cross section with a diameter of approximately 0.5 inch, and are approximately equally distanced placed such that a length of 48 inches comprises 2 aeration openings 112.

Further preferably, a flat surface structure 104 is placed adjacent to the tray to enable placement of gardening accessories thereon during gardening. For example, the flat surface structure 104 surrounds the tray at a level corresponding to the top end of the tray, thus enabling placement of gardening accessories thereon on any side of the tray and facilitating gardening from all sides of the tray.

Optionally, the raised planter 100 comprises a storage structure such as shelf 118 for enabling storage of gardening accessories thereon or, alternatively, other storage means such as, for example, a drawer or enclosed storage cabinet placed below a portion of the flat surface structure 104 and/or below a portion of the bottom plate 102A.

Preferably, a bottom end of each of the support posts 114 is mounted to base structure 116 for increasing the rigidity of the raised planter 100, as well as, to provide a substantially flat bottom surface for being placed on the ground 10 to increase the foot print of the raised planter 100 for securely placing the same onto relatively soft ground surfaces such as soil or lawn.

Further preferably, the tray of the raised planter 100 comprises one or more bottom plates 102A mounted to the support posts via a support beam structure comprising support beams 108 and 110. The four side walls 102B are connected via corner elements 120 and mounted to the support posts 114.

Further preferably, the base structure 116, the flat surface structure 104, the support posts 114, and the support beams 108 and 110 are made of U-shaped profiles. Employment of U-shaped profiles provides strength and rigidity to the structure and enables: simple assembly using conventional fasteners such as, for example, screw fasteners or pan screws; compact arrangement of the profiles for storage and shipping; and, use of commercially available profiles.

The profiles are, for example, commercially available galvanized steel profiles having a thickness of approximately 1/20 inch to 1/10 inch, while the bottom plate 102A and the side walls 102B are made of commercially available aluminum sheets having a thickness of approximately 1/20 inch to 1/10 inch, in order to ensure durability of the raised planter when exposed to various weather conditions.

As is evident to one skilled in the art, the parts of the raised planter 100 may be made of other materials such as, for example, a suitable plastic material such as Low Density Poly Ethylene (LDPE).

In an example implementation the raised planter 100 has been made of:

2 shelves 118: 3⅝ inches×16 inches;
16 studs 114: 3⅝ inches×32 inches;
2 tracks 110: 3⅝ inches×48 inches;
5 studs 108: 3⅝ inches×48 inches;
8 tracks 104 & 116: 3⅝ inches×55½ inches;
4 corner angles 120: 1½ inches×1½ inches×8 inches;
4 flat stock sides 102B: 9 inches×48 inches; and,
2 flat stock plates 102A: 24 inches×48 inches.

Figure 7:
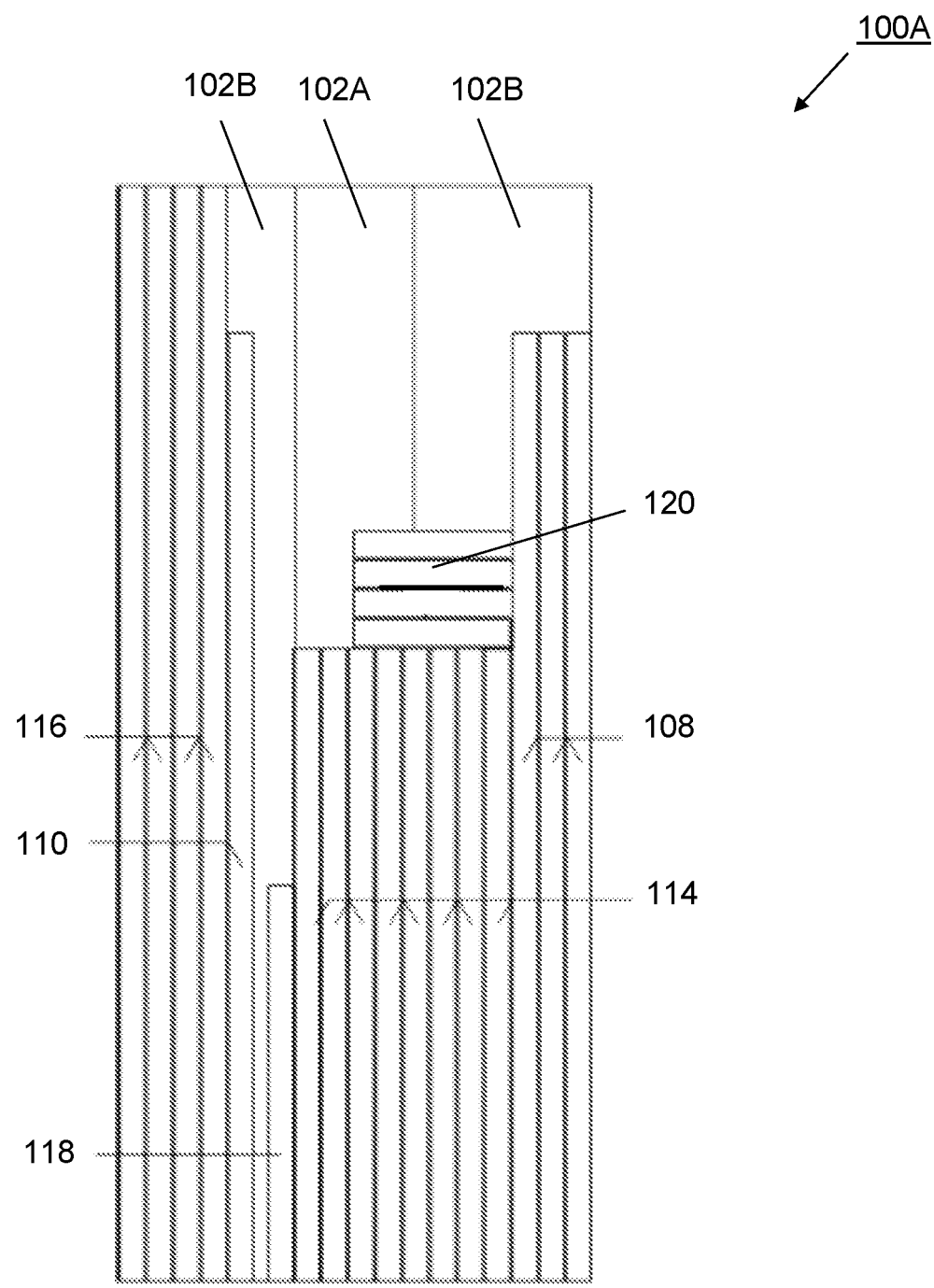
Figure 8:
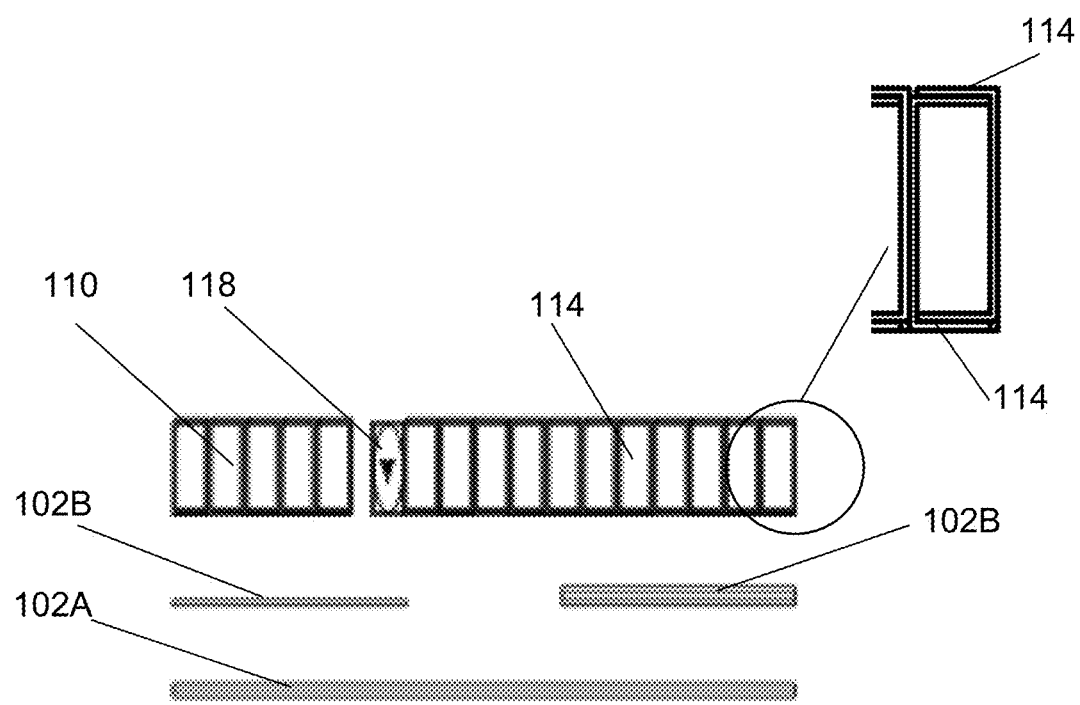

In the example implementation the parts are provided as a kit 100A for assembly and are arranged in a compact manner to fit into a box having: a length of 55½ inches; a width of 24 inches; and a height of 4 inches, as illustrated in FIGS. 7 and 8. In order to arrange the parts in a compact manner, the bottom plate 102A is provided as two pieces, while the U-shaped profiles are arranged such that two profiles are inserted into each other with the sides being in a touching relationship, as illustrated in the detail in FIG. 8.

Instructions for Assembly:

Needed:
  Sheet metal snips
  Drill
  Philips screw head for drill
  Marker
  Straight edge
  Carefully remove stock from box and locate and identify all pieces To Assemble:
1. Lay down four tracks 116 on ground 10 or a floor to form a 55 inches square
2. Cut and bend two sides on the end of two tracks 116 to accommodate the other sides so the square measures 55 inches×55 inches
3. Screw the four tracks 116 together to make a square
4. Install a stud 114 at the center of each bottom track 116 and screw in pace on both sides
5. Install the remaining studs 114 at 16 inches C/C from the center ones as per exploded diagram illustrated in FIG. 6
6. Screw in place four sides 102B flush with top of studs 114
7. Install flat surface structure tracks 104 over studs 114 and sides 102B as done for the base 116, screw to each studs 114 making sure studs are plumb
8. Draw horizontal line on each side 102B one inch from the bottom of each side
9. Screw track 110 to two opposite sides, top of track 110 should follow line one inch above bottom of each side 102B

10. Install two studs 108 in track 110 and screw them to remaining sides 102B
11. Locate center of track 110 and draw a line
12. Install center of one stud 108 in track 110 on center line drawn previously
13. Install and screw in remainder of studs 108 in track 110 at center of remaining space
14. Install flat sheets 102A on top of 108 stud frame making sure long dimension of sheet is parallel to studs 108
15. Screw in four metal corners 120 in each interior corner
16. Snip two ends of studs 118 and bend as shown to leave a 16 inches shelf, screw to planter at desired location approximately 24 inches above ground level
17. Fill tray with soil As is evident to those skilled in the art, the raised planter 100 is not limited to the dimensions hereinabove but may be adapted to various other dimensions for providing a square or rectangular shaped area for planting.

The present invention has been described herein with regard to preferred embodiments. However, it will be obvious to persons skilled in the art that a number of variations and modifications can be made without departing from the scope of the invention as described herein.

What is claimed is:

1. A raised planter comprising:
a tray adapted for containing soil;
a plurality of support posts mounted to the tray, the support posts being adapted for supporting the tray at a predetermined height above ground;
a base structure mounted to the support posts, the base structure having a substantially flat bottom surface for being placed on the ground and wherein the base structure is made of four first U-shaped elements, each of the four first U-shaped elements having a substantially flat bottom portion configured to rest on the ground along a perimeter of a projection of the tray on the ground with first and second edges thereof facing upwardly, and wherein the four first U-shaped elements are directly mounted together at respective first and second end portions thereof, wherein a first pair of U-shaped elements of the four first U-shaped elements are disposed opposite of each other, and wherein a second pair of U-shaped elements of the four first U-shaped elements are disposed opposite each other, and wherein at least one pair of U-shaped elements has an end portion of one of the first and second edges removed to receive an adjacent U-shaped element of an other pair having an orientation other than collinear such that a bottom surface of the bottom portion of the other pair is in direct contact with a top surface of the bottom portion of the one pair, and wherein each of the four first U-shaped elements is directly mounted to the respective support posts; and,
a flat surface structure placed adjacent to at least one side of the tray, the flat surface structure having a width that is sufficient for placing gardening accessories thereon.

2. The planter according to claim 1 wherein the tray comprises at least a drainage opening disposed in a bottom portion thereof.

3. The planter according to claim 2 wherein the tray comprises at least an aeration opening disposed in a side wall thereof.

4. The planter according to claim 1 wherein the flat surface structure surrounds the tray.

5. The planter according to claim 1 comprising a storage structure placed below a portion of the flat surface structure.

6. The planter according to claim 5 wherein the storage structure comprises a shelf.

7. The planter according to claim 1 wherein the tray comprises at least a bottom plate mounted to side wall plates.

8. The planter according to claim 1 wherein the flat surface structure is made of at least one first U-shaped element and wherein the first U-shaped elements have a same sized cross-section such that two first U-shaped elements can be inserted into each other with the edges being in a touching relationship.

9. The planter according to claim 8 wherein the support posts are made of a plurality of second U-shaped elements, the second U-shaped elements having a same sized cross-section as the first U-shaped elements such that two second U-shaped elements can be inserted into each other with edges being in a touching relationship and such that the two second U-shaped elements when inserted into each other have a same height as the two first U-shaped elements when inserted into each other.

10. The planter according to claim 9 comprising a support beam structure mounted to the support posts for supporting the tray, the support beam structure being made of third U-shaped elements having a same sized cross-section as the first U-shaped elements such that two third U-shaped elements can be inserted into each other with edges being in a touching relationship and such that the two third U-shaped elements when inserted into each other have a same height as the two first U-shaped elements when inserted into each other.

11. The planter according to claim 1 wherein the support posts, the base structure, and the flat surface structure are made of galvanized steel and wherein the tray is made of aluminum sheets.

12. The planter according to claim 1 wherein a thickness of the bottom portion and the first and second edges of each of the four first U-shaped elements is substantially smaller than a distance between the first and the second edge.

13. The planter according to claim 12 wherein the distance between the first and the second edge of each of the four first U-shaped elements is larger than a height of the upwardly facing first and the second edges.

14. The planter according to claim 1, wherein each adjacent U-shaped element of the U-shaped element pair having an orientation other than collinear is disposed in a generally perpendicular orientation relative to the at least one pair of U-shaped elements that has an end portion of one of the first and second edges removed.

* * * * *